United States Patent [19]
Swanson et al.

[11] Patent Number: 5,967,364
[45] Date of Patent: Oct. 19, 1999

[54] LARGE PRODUCT VENDING SYSTEM

[75] Inventors: Jon L. Swanson; Alvin V. Russell, both of Aiken, S.C.

[73] Assignee: Dixie-Narco, Inc., Williston, S.C.

[21] Appl. No.: 08/967,407

[22] Filed: Nov. 11, 1997

[51] Int. Cl.⁶ .............................. G07F 11/00; B65G 59/00
[52] U.S. Cl. ................................ 221/6; 221/67; 221/241; 221/301
[58] Field of Search ............................... 221/6, 299, 301, 221/131, 116, 67, 241

[56] References Cited

U.S. PATENT DOCUMENTS

| Re. 25,321 | 1/1963 | Tortes | 221/67 |
| 2,585,011 | 2/1952 | Joffson | 221/67 |
| 3,158,247 | 11/1964 | Gale | 221/67 |
| 3,438,545 | 4/1969 | Helsing | 221/67 |
| 3,463,355 | 8/1969 | Ural | 221/67 |
| 4,019,650 | 4/1977 | Oden | 221/116 |
| 4,036,400 | 7/1977 | Oden | 221/67 |

FOREIGN PATENT DOCUMENTS

| 404130992 | 5/1992 | Japan | 221/6 |

*Primary Examiner*—H. Grant Skaggs
*Attorney, Agent, or Firm*—Renner, Kenner, Greive, Bobak, Taylor & Weber

[57] ABSTRACT

A large product vending system which allows for the dispensing of large diameter product from a vending machine is presented. The system includes a dispense mechanism associated with the existing column walls and columns defined therebetween of a machine used for smaller diameter product. A motor and a link arm are associated with each column and control the operation of a cradle which holds the product within the column while positioning one of the products for dispensing upon actuation of the dispense mechanism. The cradle includes opposed end plates which are connected at each end thereof by a blocking bar and a dispense rod. When the cradle is cycled, the dispense rod releases the lowest product while the blocking bar engages the next product to be dispensed. After the cycle of the motor allows the product to be dispensed to clear the dispense rod, the blocking bar is moved out of the way of the next product which is then held in place by the dispense rod and one of the column walls.

12 Claims, 2 Drawing Sheets

LARGE PRODUCT VENDING SYSTEM

TECHNICAL FIELD

The invention herein resides generally in the art of vending machines. More particularly, the present invention relates to dispensing mechanisms which control the delivery of product from a vending machine. Specifically, the present invention relates to modification of a vending machine which accepts and dispenses a product larger than normally dispensed.

BACKGROUND ART

It is known to utilize coin or currency operated vending machines to dispense consumable products such as beverage cans, candy or other snacks. Typically, these machines operate by depositing a predetermined amount of currency or coinage, selecting the desired product and then withdrawing the dispensed product from a retrieval area. In the dispensing of beverages, a beverage vending machine typically provides a selection of five or six different flavors, typically in 12 ounce cans having an outer diameter of about 2.5 inches. The cans are loaded into columns defined by column walls and held within the column by a dispensing mechanism. When a particular product is selected, the dispensing mechanism cycles such that one unit is dispensed while the other units are held in place. Once the dispensed unit is delivered, the mechanism cycles to place a next unit in position for delivery.

Previous delivery devices, such as disclosed in U.S. Pat. Nos. 3,463,355 and 4,019,650, are structured to maximize the amount of product that can be stored in a particular column while providing a dispensing mechanism that can fit within the column and reliably dispense the product. In order to maximize the number of cans within the vending machine, the column is sized so that the cans are placed in a staggered relationship with one another. These vending machines require the use of a device placed in the middle of a column, which when cycled or rotated, allows for dispensing of a single can.

Unfortunately, the above-described machines are not capable of dispensing larger diameter products such as 2 liter bottles of beverage and the like. Although these larger products can fit within the columns of existing vending machines, the dispensing mechanism, due to its center placement in the column, blocks the travel path of the larger item.

DISCLOSURE OF INVENTION

In light of the foregoing, it is a first aspect of the present invention to provide a large product vending machine.

Another aspect of the present invention is to provide a vending machine which has walls defining columns therebetween for receiving product, wherein the product is held within the column by a cradle.

Still a further aspect of the present invention, as set forth above, is to provide the cradle placed in an off-center position between the column walls to hold the product in place while allowing dispensing of a single product.

Still another aspect of the present invention, as set forth above, is to rotatably support the cradle within the column between a plate and a back wall.

Yet another aspect of the present invention, as set forth above, is to provide a motor coupled to the cradle through linkage for controlling dispensing of product.

A further aspect of the present invention, as set forth above, is to provide the cradle with two opposed end plates connected to one another by a blocking bar and a dispense rod.

Yet a further aspect of the present invention, as set forth above, is to control dispensing of the product by actuating the motor and the linkage to cycle the cradle from a load position to a vending position and back to the load position.

Still a further aspect of the present invention, as set forth above, is to position the cradle within the column such that the dispense rod and one of the column walls hold a product to be dispensed within the column and whereupon cycling of the cradle causes the product to be dispensed to fall through the column while the blocking bar engages the next product to be dispensed, and after the product to be dispensed exits from the column, the blocking bar allows the next product to be dispensed to engage the column wall and the dispense rod to await the next cycling of the cradle.

The foregoing and other aspects of the present invention, which shall become apparent as the detailed description proceeds, are achieved by a product vending system, comprising a back wall opposite a front plate with at least two column walls therebetween forming a column for retaining product; a cradle pivotably interposed between the back wall and the front plate to hold the product within the column, the cradle placed in an off-center position with respect to the column walls; and a dispense mechanism for oscillating the cradle between a load position and a vend position for dispensing one product while holding remaining product in the column.

Another aspect of the present invention, which shall become apparent herein, is obtained by a dispensing mechanism used with a product vending machine which provides a plurality of column walls supported by a back wall, with columns defined between each column wall, the dispensing mechanism comprising a front plate opposite the back wall and at least partially enclosing the columns, the front plate having a nest opening; a cradle rotatably disposed between the back wall and the front plate within each column, the cradle placed in an off-center position between the column walls; and a motor mounted upon the front plate and coupled to the cradle through the nest opening for oscillating the cradle between a load position and a vend position for dispensing one product while holding remaining product in the chute.

BRIEF DESCRIPTION OF THE DRAWINGS

For a complete understanding of the objects, techniques and structure of the invention, reference should be made to the following detailed description and the accompanying drawings wherein.

BEST MODE FOR CARRYING OUT THE INVENTION

Figure 1:
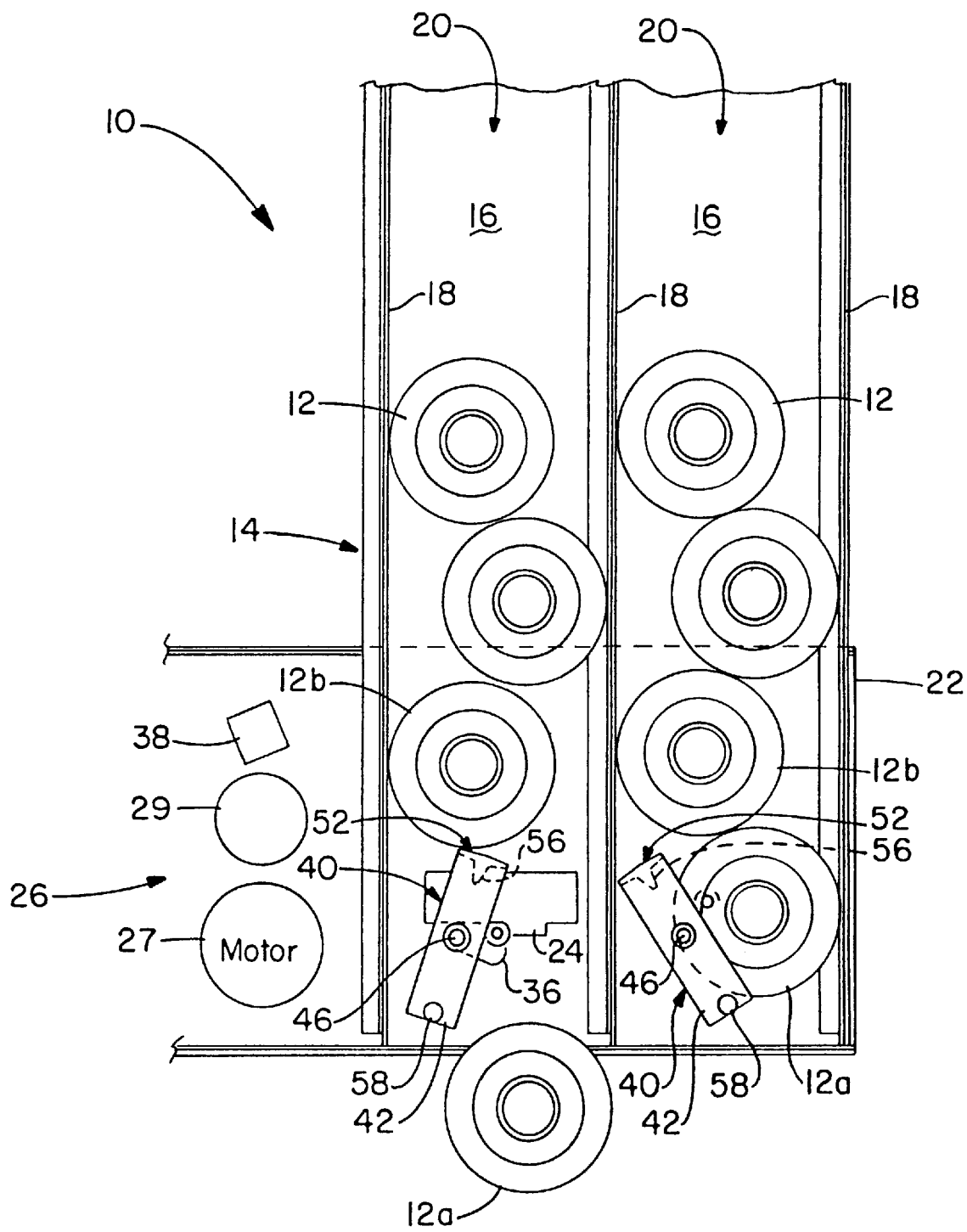
FIG. 1 is a schematic cross-sectional view of the apparatus of the invention.

Referring now to the drawings, it can be seen that a large product vending system is designated generally by the numeral 10. As shown, the system 10 is employed to dispense product bottles 12 as requested by the consumer. The system 10 includes a product array 14 for holding the bottles 12 to be dispensed. The product array 14 includes a back wall 16 from which perpendicularly extends column walls 18 which are substantially parallel to one another to define a column 20. It will be appreciated that the product array 14 is originally provided for dispensing 12 ounce cans having a diameter of about 2.5 inches. Typically, the 12 ounce cans are placed in a staggered relationship with one another to facilitate maximization of the space within the vending machine and/or dispensing of the can. As will become apparent from the description below, the present invention facilitates the adaptation of a 12 ounce can vending machine to a machine which can dispense larger diameter product, such as 2 liter bottles, and vice-versa. In the preferred embodiment, the product bottles 12 have a diameter of about 4.150".

A plate 22 is disposed across the front of the product array 14. The plate 22 serves at least two purposes; first, to hold the product bottles 12 within the columns 20 and secondly, for carrying mechanisms required for the operation of the system 10. The plate 22 provides several openings such as a nest 24 to hold one of the mechanisms.

A dispense mechanism 26 is mounted upon the plate 22 and is coupled to the nest 24 as shown. As seen in the portion of FIG. 1 not broken away and FIG. 2, the dispense mechanism 26 includes a motor 27, which rotates a motor shaft 28, substantially centered between the column walls 18. A processor (not shown) controls actuation of the motor 28 after receipt of the predetermined currency for actuation of the dispensing cycle. A cam 29 is coupled to the motor 27. The cam 29 functions to stop rotational motion of the motor shaft 28 after travelling a predetermined angular distance.

A linkage 30 is connected to the motor shaft 28 and in the present embodiment, stops only once during a full range or cycle of motion. The linkage 30 includes a drive arm 31 which has a shaft hole 32 to which the motor shaft 28 is fixably attached. The drive arm 31 includes a boss 33, which extends in a direction opposite the motor shaft 28, that is rotatably fixed to a link arm 34 through a boss hole 35. At an end opposite the boss hole 35, the link arm 34 has a stud hole 36. As shown, the link arm 34 may be provided with a step such that the boss hole 35 is offset from the stud hole 36. The linkage 30 controls dispensing of the product bottles 12.

Figure 2:
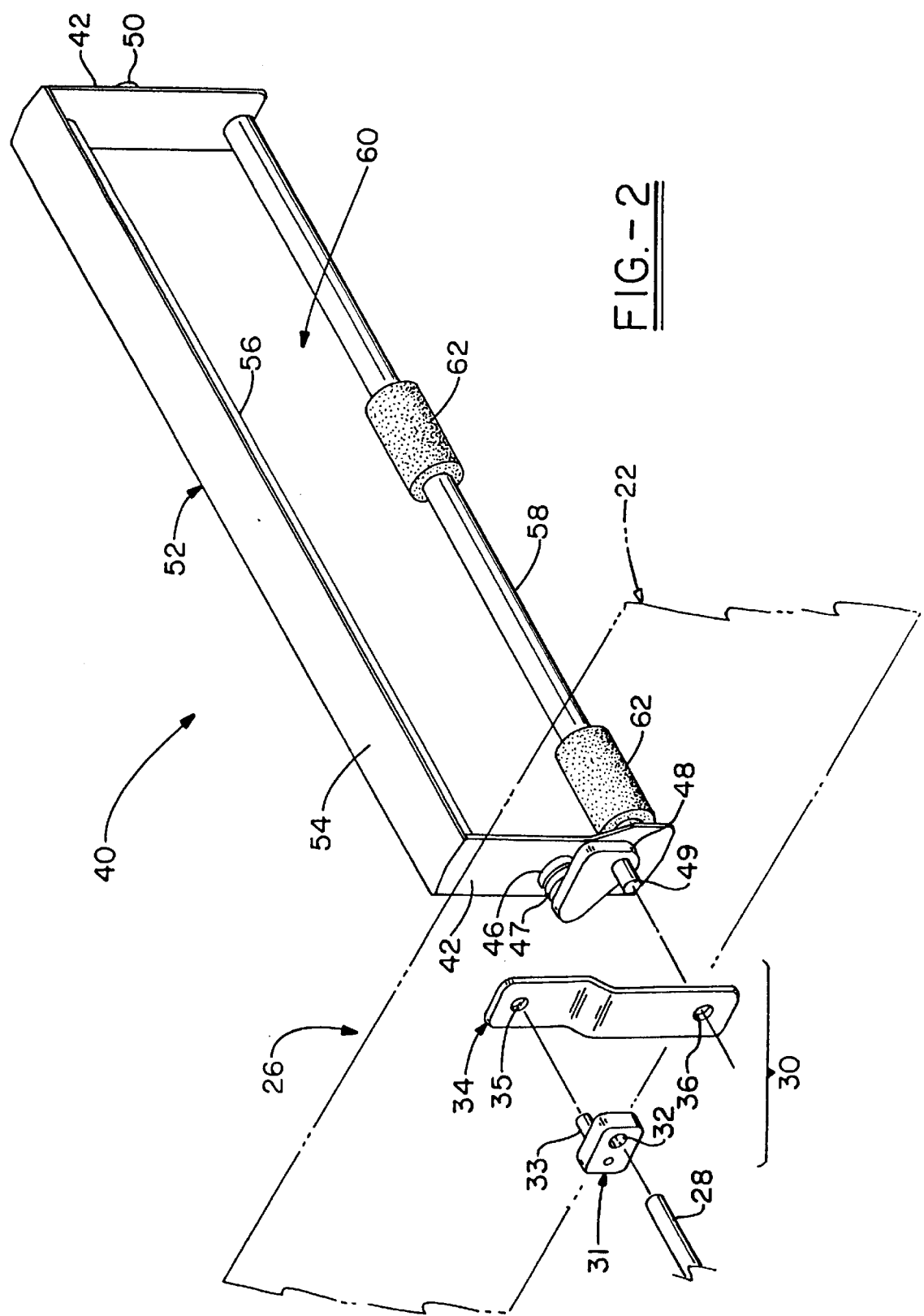
FIG. 2 is a perspective assembly drawing of a cradle and associated linkage employed in the present invention.

A sensor 38 may be provided on the plate 22 for monitoring the status of the product 12 within the column 20. In particular, the sensor 38 may detect when there is no longer product available within the column 20 and may notify the processor of such status. The sensor 38 may detect the presence of the product with mechanical, optical or other components known in the art. A cradle 40, which is best seen in FIGS. 1 and 2, is substantially disposed between the plate 22 and the back wall 16 in an off-center position with respect to the column walls 18. In FIG. 1, the cradle 40 is shown offset to the left; however, the cradle 40 could be provided in a right offset position. The cradle 40 includes opposed end plates 42 which are substantially rectangular in shape. A pivot pin 46 extends from one of the end plates 42 and is received through the nest 24 and is connected to the motor 27 by the linkage 30. The pivot pin 46 provides a channel 47 that is rotatably received in the nest 24. Extending transversely from the end of the pivot pin 46 is a triangular shaped crank 48. A stud 49 extends transversely from the crank 48 and is rotatably received in the stud hole 36. The stud 49 extends in the same direction as the pivot pin 46. A support pin 50 extends from the other end plate 42 in a direction opposite the pivot pin 46 and is rotatably received within the back wall 16. Accordingly, the cradle 40 is pivotable or partially rotatable within the column 20.

The cradle 40 further includes a blocking bar 52, which is substantially T-shaped, for connecting one edge of the opposed end plates 42 to one another. The blocking bar 52 includes a bottle edge 54 at the top of the T. Extending substantially perpendicularly from the bottle edge 54, at about a mid-point thereof, is a leg 56. Connecting the other edge of the opposed end plates 42 to one another is a dispense rod 58 which is substantially round along the entire length thereof. As presented, the end plates 42, the blocking bar 52 and the dispense rod 58 form a cavity 60 which receives a portion of the lowermost product bottle 12 when the cradle 40 is placed in a load position. If desired, a pair of spacers 62 may be secured around the dispense rod 58 for the purpose of protecting the product 12 as it passes from a load position, where all the product bottles are held, through to a vend position where one of the product bottles 12 is dispensed. The spacers may also be used to accommodate other large product sizes. As shown in FIG. 1, the rightmost column shows the cradle 40 in the load position and center column 20 shows the cradle in the vend position.

As best seen in FIG. 1, the rightmost column wall 18 and the dispense rod 58 trap or hold a product bottle 12a to be dispensed until actuation of the dispense mechanism 26. Accordingly, a portion of the product bottle 12a is disposed within the cavity 60. At rest, the blocking bar 52 is positioned proximal the leftmost column wall 18 and is not in contact with any of the product 12. It will further be appreciated that the distance between the dispense rod 58 and the blocking bar 52 allows different outer diameter sized product to be dispensed. However, a larger diameter product than presently shown may require a greater distance between the dispense rod 58 and the blocking bar 52 for reasons which will become apparent during the description of the dispensing cycle. Alternatively, the size or diameter of the spacers 62 may be adjusted.

Upon actuation of the dispensing mechanism 26, the motor 27 is energized and initiates motion of the link arm 34 via the motor shaft 28. The drive arm 31 is rotated, which in turn moves the link arm 34 via the boss 33, which causes rotation of the crank 48. Accordingly, the link arm 34 causes a clockwise rotation or movement of the cradle 40 in a first direction. In other words, the dispense rod 58 moves in a first direction (to the left as shown in FIG. 1) and the blocking bar 52 moves in a second direction (to the right). This causes the product bottle 12a to be released from the dispense rod 58 and fall through the column 20 to the consumer. Simultaneously, a leading edge of the blocking bar 52 contacts and engages a next product bottle 12b to be dispensed and supports it and the other product bottles 12. It will be appreciated that the blocking bar 52 is sized to first contact the underside of the next product bottle 12b to be dispensed without crushing it or causing any damage to the product bottle 12a prior to its release. As best seen in the center column of FIG. 1, the bottle edge 54 maintains contact with the product bottle 12b as product bottle 12a falls through the column.

Once the linkage 30 exhausts the travel of the cradle 40 in a clockwise direction, the cradle 40 begins rotation in a counter-clockwise direction. In other words, the blocking bar 52 moves in the first direction (to the left) while the dispense rod 58 moves in the second direction (to the right). Accordingly, the bottle edge 54 and the leftmost column wall 18 support the next product bottle 12b until the trailing portion of the bottle edge 54 shifts the product bottle 12b to the right and away from any supporting force provided by the leftmost column wall 18. At this time, the product bottle 12b becomes the product bottle 12a and falls into the cavity 60 and contacts the dispense rod 58 and upon completion of the rotation of the cradle 40 the right side of the column wall 18. It should be apparent that the cradle 40 may be positioned upon the other side of the column 20 by reversing the position of the plate 22 and by moving the position of the hole in the back wall 16 that supports the cradle 40.

It is apparent then from the above description of the structure and operation of the system 10 that the problems associated with previous vending machines have been overcome. In particular, the primary advantage of the system 10 is that it allows for configuration of vending machines which typically dispense cans to dispense larger diameter bottles. Of course, the vending machines can easily be converted back to a can-type vending machine by replacing the motor 28, the linkage 30 and the cradle 40. It will be appreciated that the plate 22 is provided with a nest that can accommodate dispense mechanisms for both cans and bottles. This modification of a machine allows for an owner of the machine to better manage product inventory by enabling the sale of either cans or bottles as needed. Still another advantage of the present invention is that it provides a simplified dispensing action in that the linkage motion is stopped only once for full range of motion, whereas cradles used to dispense cans are required to be stopped up to six times for full range of motion and must be stopped at least twice to avoid a double vending of product. Therefore, the present invention reduces wear on the dispense mechanism and the cradle.

Thus, it can be seen that the objects of the invention have been satisfied by the structure presented above. While in accordance with the patents statutes, only the best mode and preferred embodiments of the invention have been presented and described in detail, the invention is not limited thereto or thereby. Accordingly, for an appreciation of the true scope and breadth of the invention, reference should be made to the following claims.

What is claimed is:

1. A product vending system, comprising:
    a back wall opposite a front plate with at least two permanently fixed column walls therebetween forming at least one column for retaining product, said fixed column walls spaced to normally hold a maximum number of smaller sized product;
    a single cradle pivotably interposed between said back wall and said front plate to hold a larger-sized product within each said column, wherein said larger-sized product has a diameter substantially greater than one-half of the fixed column width, said cradle placed in an adjustable off-center position with respect to said fixed column walls, positioning of said cradle dependent upon the size of said larger-sized product; and
    a dispense mechanism for oscillating each said cradle between a load position and a vend position for dispensing one larger-sized product while holding remaining larger-sized product in said column.

2. The product vending system, according to claim 1, wherein said cradle comprises:
    opposed end plates interconnected by a blocking bar at one edge and a dispense rod at an opposite edge;
    a support pin extending from one of said end plates and rotatably received in said back wall; and
    a pivot pin extending from the other of said end plates and rotatably received in said front plate, said dispense mechanism coupled to one of said pivot pin and said support pin for oscillating said cradle between the load position and the vend position.

3. The product vending system, according to claim 2 wherein said dispense rod carries a spacer for supporting the product when said cradle is in the load position.

4. The product vending system, according to claim 2 wherein said blocking bar includes a bottle edge for bearing against the remaining product as said cradle oscillates.

5. The product vending system, according to claim 1, wherein said dispense mechanism comprises:
    a motor coupled to said cradle by a link arm, said link arm secured to one end of said cradle, wherein said motor is remotely actuated to cycle said link arm and said cradle from the load position to the vend position and then back to the load position.

6. The product vending system according to claim 5, wherein said dispense mechanism is mounted upon said front plate, said front plate having a nest through which a pivot pin of said cradle passes for connection to a link arm through a crank,
    said cradle initially holding a product to be dispensed against one of said column walls, said link arm moving a first portion of said cradle in a first direction to engage a next product to be dispensed and maintain engagement therewith while a second portion of said cradle moves in a second direction and allows the product to be dispensed to fall through said column, said link arm moving said first portion of said cradle in the second direction such that the next product to be dispensed is positioned between said first portion of said cradle and the one said column wall.

7. The product vending machine according to claim 1, wherein said cradle comprises
    opposed end plates interconnected by a blocking bar and a dispense rod;
    a support pin extending from one of said end plates and rotatably received in said back wall; and
    a pivot pin extending from the other of said end plates and rotatably received in said front plate, said dispense mechanism coupled to one of said pivot pin and said support pin for oscillating said cradle between the load position and the vend position; and
    wherein said dispense mechanism comprises
        a motor coupled to said cradle by a link arm, said link arm secured to one of said pivot pin and said support pin, wherein said motor is remotely actuated to cycle said link arm and said cradle from the load position to the vend position and then back to the load position;
    said dispense rod initially holding a product to be dispensed against one of said column walls, said link arm rotating said cradle in a first direction such that said blocking bar first engages a next product to be dispensed and maintains engagement therewith while said dispense rod moves away from the one column wall and allows the product to be dispensed to fall through said chute, said link arm rotating said cradle in an a second direction such that the next product to be dispensed is positioned between said dispense rod and the one said column wall.

8. A dispensing mechanism used with a product vending machine, the dispensing mechanism comprising:
    a front plate opposite a back wall and at least partially enclosing at least one pair of permanently fixed column walls to form a fixed-width column that normally holds a maximum number of smaller-sized product between said front plate and said back wall, said front plate having a nest opening;
    a cradle rotatably disposed between said back wall and said front plate within each said fixed-width column, said cradle selectively placed in an off-centerposition between the column walls, wherein said cradle comprises opposed end plates interconnected to one another by a blocking bar and a dispense rod to define a cavity, said dispense rod and one of said fixed column walls supporting a product to be dispensed, and wherein said cradle is selectively placed in an off-center position according to the size of the larger diameter product; and a motor mounted upon said front plate and coupled to said cradle through said nest opening for oscillating said cradle between a load position and a vend position for dispensing one product while holding remaining product in said fixed-width column, wherein said motor is connected by a link arm to a pivot pin extending from one of said opposed end plates and whereupon actuation of said motor causes said cradle to rotate such that said blocking bar holds a next product to be dispensed and said dispense rod releases the product to be dispensed into said fixed-width column, and whereupon said cradle stops and then starts to rotate in an opposite direction to allow the next product to be dispensed to be held by said dispense rod and one of said column walls and wherein the dispensing action of said cradle is stopped only once for dispensing of a product.

9. The dispensing mechanism according to claim 8, wherein said dispense rod includes a spacer secured thereto.

10. The dispensing mechanism according to claim 8, wherein said front plate has a sensor mounted thereto for monitoring the presence of product within said fixed-width column.

11. The dispensing mechanism according to claim 8, wherein the product is partially received within said cavity when said cradle is holding the product to be dispensed.

12. The dispensing mechanism according to claim 8, further comprising a support pin that extends in a direction opposite said pivot pin from the other of said opposed end plates, wherein said support pin is rotatably received by the back wall.

* * * * *